US011444960B2

United States Patent
Drapeau et al.

(10) Patent No.: US 11,444,960 B2
(45) Date of Patent: Sep. 13, 2022

(54) STATEFUL RULE GENERATION FOR BEHAVIOR BASED THREAT DETECTION

(71) Applicant: VMware, Inc., Palo Alto, CA (US)

(72) Inventors: Paul M. Drapeau, Mendon, MA (US); Kyle P. Gwinnup, Somerville, MA (US)

(73) Assignee: VMware, Inc., Palo Alto, CA (US)

( * ) Notice: Subject to any disclaimer, the term of this patent is extended or adjusted under 35 U.S.C. 154(b) by 351 days.

(21) Appl. No.: 16/718,183

(22) Filed: Dec. 18, 2019

(65) Prior Publication Data
US 2020/0389472 A1 Dec. 10, 2020

Related U.S. Application Data

(60) Provisional application No. 62/857,465, filed on Jun. 5, 2019.

(51) Int. Cl.
*H04L 9/40* (2022.01)
*H04L 43/0817* (2022.01)

(52) U.S. Cl.
CPC ...... *H04L 63/1416* (2013.01); *H04L 43/0817* (2013.01); *H04L 63/0263* (2013.01); *H04L 63/1433* (2013.01); *H04L 63/20* (2013.01)

(58) Field of Classification Search
None
See application file for complete search history.

(56) References Cited

U.S. PATENT DOCUMENTS

| 9,223,978 | B2 * | 12/2015 | Kraemer | H04L 63/1441 |
| 9,679,136 | B2 | 6/2017 | Sallam | |
| 9,965,627 | B2 | 5/2018 | Ray et al. | |
| 11,119,739 | B1 * | 9/2021 | Allen | H04L 63/0263 |
| 11,201,887 | B1 * | 12/2021 | Brown | H04L 63/1425 |
| 2007/0192856 | A1 * | 8/2007 | Pillar | H04L 63/0263 726/22 |

(Continued)

OTHER PUBLICATIONS

Weidong Cui, "Automating Malware Detection by Inferring Intent," Technical Report No. UCB/EECS-2006-115, University of California at Berkeley, Department of Electrical Engineering and Computer Sciences, Sep. 14, 2006 (132 pages), http://www.eecs.berkeley.edu/Pubs/TechRpts/2006/EECS-2006-115.html.

(Continued)

*Primary Examiner* — Joseph P Hirl
*Assistant Examiner* — Hassan Saadoun

(57) ABSTRACT

Improved tools and techniques for generating stateful rules for behavior-based threat detection enable threat analysts, who do not have advanced computer programming skills, to quickly and easily generate high-level representations of stateful behavioral rules, which are then compiled into a format suitable for execution by a stateful rule processing engine. In some examples, the high-level representations of stateful rules are coded in a high-level, domain specific language (DSL). The DSL may provide high-level primitives suitable for (1) expressing sequences of attack behaviors, (2) tagging computational entities (e.g., threads, processes, applications, systems, users, etc.) with states (e.g., user-defined states), and/or (3) performing operations on endpoint nodes (e.g., reporting activity, blocking activity, terminating processes, etc.).

20 Claims, 8 Drawing Sheets

(56) References Cited

U.S. PATENT DOCUMENTS

| | | | |
|---|---|---|---|
| 2015/0261955 A1* | 9/2015 | Huang | H04L 63/1433 726/23 |
| 2015/0269383 A1* | 9/2015 | Lang | H04L 63/20 726/1 |
| 2016/0078225 A1* | 3/2016 | Ray | G06F 21/552 726/23 |
| 2016/0147995 A1* | 5/2016 | Sallam | G06F 21/561 726/24 |
| 2019/0342178 A1* | 11/2019 | Balasubramanian | G06N 5/00 |

OTHER PUBLICATIONS

Kirillov et al., "The Concepts of Malware Attribute Enumeration and Characterization," (MAEC) Effort, published 2009, 20 pages.

Unknown, "A New Approach to Threat Detection: How a Massive State Machine in the Cloud Uses Real-Time and Retrospective Analytics to Identify Multi-Stage Attacks," A Protectwise Whitepaper, Jan. 17, 2017 (14 pages).

* cited by examiner

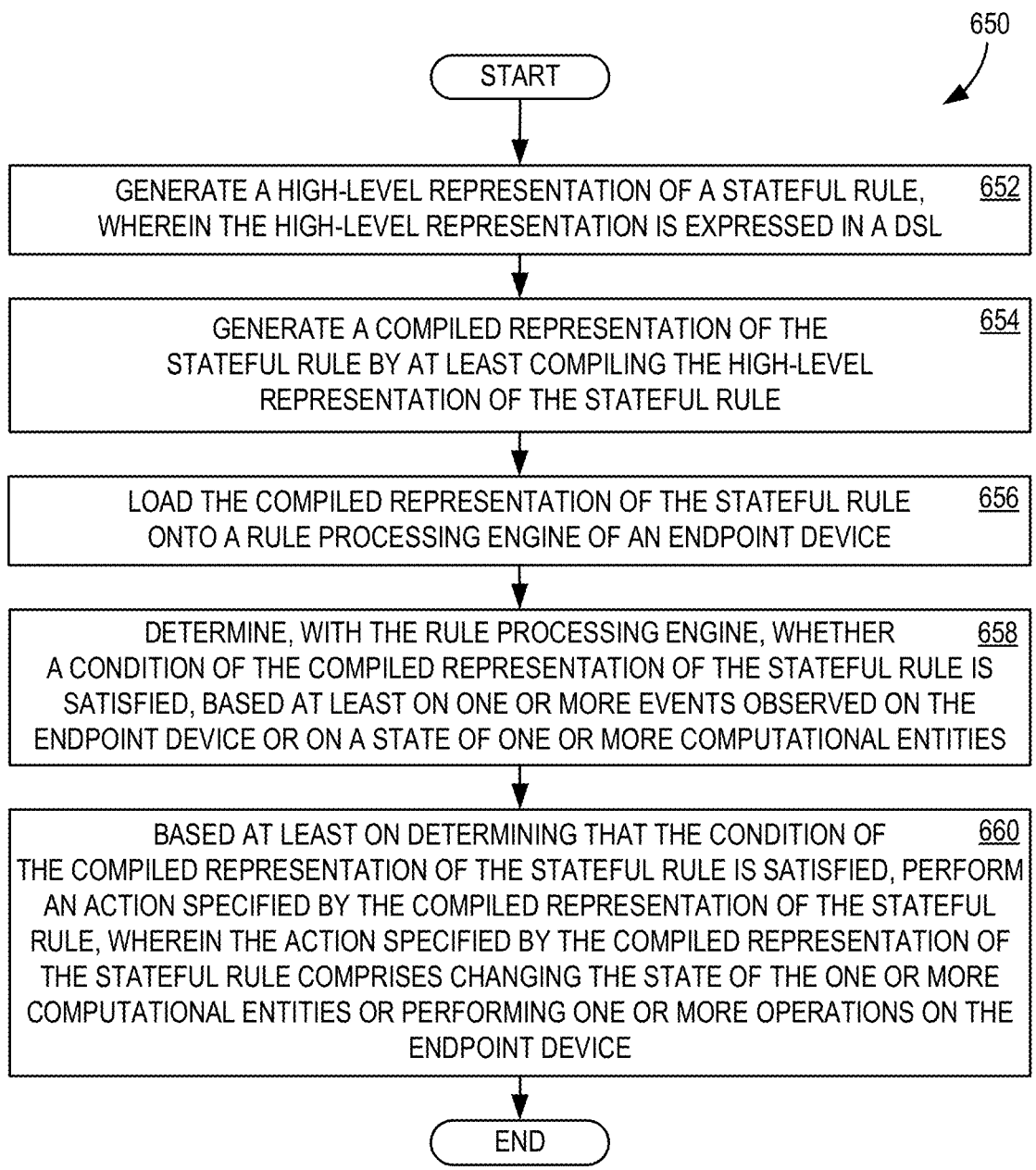

STATEFUL RULE GENERATION FOR BEHAVIOR BASED THREAT DETECTION

CROSS-REFERENCE TO RELATED APPLICATIONS

This application claims the benefit of U.S. Provisional Patent Application No. 62/857,465, filed Jun. 5, 2019, entitled "Tools and Methods for Generating Stateful Rules for Behavior-based Threat Detection, and Related Systems and Apparatus", the entirety of which is hereby incorporated by reference herein

BACKGROUND

As computer systems and networks (e.g., the Internet) are increasingly integrated into public activities (e.g., management and operation of governmental organizations) and private activities (e.g., personal activities, management and operation of households and businesses, etc.), cybersecurity threats (also referred to herein as "cyber threats" or "threatware") pose an increasingly significant threat to such pursuits. Threatware generally attempts to disrupt operation of computer systems (e.g., by taking control of computational resources and using those resources for unauthorized purposes, by disabling individual computers or entire networks, by damaging or otherwise sabotaging system components, etc.) and/or to steal resources from computer systems (e.g., by gathering sensitive data). Threatware can be deployed in many forms, including malware, computer viruses, worms, trojan horses, ransomware, spyware, adware, scareware, keystroke loggers, rootkits, bots, crimeware, phishing scams, etc.

Computer users devote significant resources to detecting cyber threats and preventing such threats from disrupting the operations of their computer systems or stealing their computer-based resources. Conventional cybersecurity platforms have relied extensively on static "indicators of compromise" (IOCs) for detecting threatware. In general, static, IOC-based threatware detection involves obtaining a signature of a static attribute of a digital resource (e.g., file, script, network packet, network address, etc.) associated with the threatware and adding the threatware's signature to a database (often referred to as a "blocklist") of known cybersecurity threats. When a user attempts to access (e.g., download, open, execute, etc.) a digital resource, the cybersecurity platform scans the resource and extracts its static signature. If the resource's signature matches a signature on the blocklist, the cybersecurity platform detects the presence of a threat and intervenes to protect the computer system from the threatware (e.g., by quarantining or deleting the threatening file).

Static, IOC-based techniques for detecting threatware are useful for quickly detecting known threats. However, these techniques can be circumvented by new threats that are not yet blocklisted (e.g., zero-day threatware or next-generation threatware) or by threatware that modifies itself to avoid matching a signature on the blocklist (e.g., oligomorphic, polymorphic, or metamorphic threatware).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for generating a stateful rule for behavior based threat detection by: generating a high-level representation of the stateful rule, wherein the high-level representation is expressed in a domain-specific programming language (DSL); generating a compiled representation of the stateful rule by at least compiling the high-level representation of the stateful rule; loading the compiled representation of the stateful rule onto a rule processing engine of an endpoint node; determining, with the rule processing engine, whether a condition of the compiled representation of the stateful rule is satisfied, based at least on one or more events observed on the endpoint node or on a state of one or more computational entities; and based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node. It should be understood that compiling includes transpiling, for example from one human-readable language to another human-readable language that is more prone to errors.

BRIEF DESCRIPTION OF THE DRAWINGS

The present description will be better understood from the following detailed description read in the light of the accompanying drawings, wherein:

FIGS. 6A and 6B illustrates additional flow charts of exemplary operations associated with the architecture of FIG. 1.

DETAILED DESCRIPTION

Figure 1:
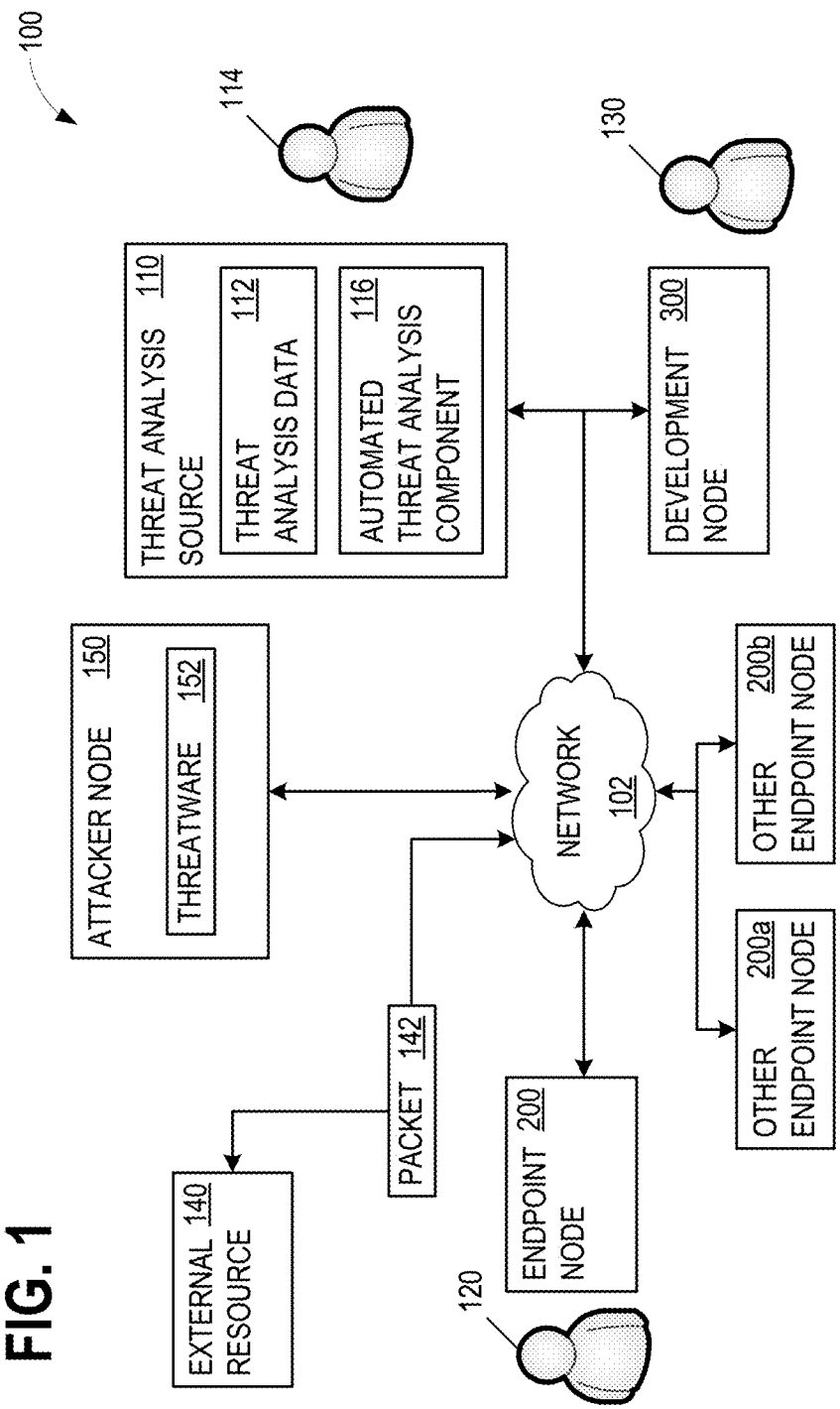
FIG. 1 illustrates a block diagram of an example architecture that can advantageously employ stateful rule generation for behavior based threat detection.

The spectrum of potential threats ("threatscape") posed by threatware continues to evolve rapidly. Some cybersecurity platforms rely on behavior-based techniques for detecting cyber threats. In general, behavior-based threat detection involves monitoring the execution of a computational unit (e.g., a thread, a process, an application, etc.) and identifying features of the computational unit's execution that are suspicious (e.g., behaviors generally considered to be suspicious and/or commonly exhibited by threatware, which may include unpacking code, modifying the host file, logging keystrokes, etc.). When such suspicious behaviors are identified, the cybersecurity platform intervenes to protect the computer system (e.g., by terminating or quarantining the computational unit) and/or assess the threat (e.g., by initiating a forensic investigation of the computational unit, etc.). Some behavior-based threatware detection techniques can protect computer systems from certain types of threats (e.g., zero-day threatware and self-modifying threatware) that are difficult to detect using blocklists of static signatures.

Some behavior-based threat detection engines may enforce static behavioral rules. For example, a static behavior rule may indicate that a particular computational entity (e.g., thread, process, application, system, user, etc.) is or is not permitted to perform a particular action (e.g., make a particular API call, initiate network communication, etc.). A threat detection engine may intervene to protect the computer system if a computational entity attempts to perform an action that is prohibited by a static rule (a "blocklisted" action, also referred to as a "B action") or an action that is not permitted by a static rule (a "non-allowlisted" action, also referred to as a "NA action"). Some cybersecurity platforms enforce static behavioral rules in isolation, without reference to the state of the computational entity attempting to perform the action and/or without reference to the broader state of the computing environment in which the computational entity is attempting to perform the action, including but not limited to the states of other computational entities within that computing environment.

In contrast, some examples of cybersecurity platforms described herein may enforce stateful behavioral rules, such that the platform's determination as to whether a particular computational entity is permitted to perform a particular action may depend on the state of the computational entity and/or the broader state of the computing environment in which the computational entity is attempting to perform the action. As used herein, "stateful" or "static" means that a node or program (application) keeps track of the state of interactions, for example, by setting values in a storage field designated for that purpose. This contrasts with stateless, for a record of previous interactions is not similarly used, so that each interaction request is handled based on contemporaneous information.

One of ordinary skill in the art will appreciate that platforms capable of enforcing stateful behavioral rules may use state machines to track the states of computational entities. The platforms may use these state machines to infer the behaviors being observed and/or the intent of the potential attacker or malware, and may further use these state machines to determine whether to allow, report, block, or terminate particular behaviors by particular computational entities. Cybersecurity platforms capable of enforcing stateful behavioral rules may generally perform better than platforms that are capable of enforcing only isolated behavioral rules, at least in certain respects. For example, platforms capable of enforcing stateful behavioral rules may generate false positive alerts at a much lower rate than platforms that enforce only isolated behavioral rules, because stateful behavioral rules may define suspicious behavior with much more precision than can be achieved using isolated behavioral rules.

Unfortunately, conventional techniques for generating new stateful behavioral rules (or adapting existing stateful behavioral rules) and deploying the new or adapted rules on stateful rule processing engines can be cumbersome and inefficient. The result of such burdensome operation is that that conventional tools make it difficult for developers to rapidly adapt cybersecurity platforms to leverage the most up-to-date threat information and provide best potential protection against evolving threats. For example, toolchains available for converting threat analysts' descriptions of threatware behavior into stateful rules, that can be enforced by rule processing engines (e.g., event-driven rule processing engines that respond to particular sets of events monitored by cybersecurity platforms), can be difficult to use, particularly for developers who lack advanced computer programming skills.

Unfortunately, conventional techniques for generating new stateful behavioral rules (or adapting existing stateful behavioral rules) and deploying the new or adapted rules on stateful rule processing engines may be cumbersome and inefficient, to the extent that these tools make it difficult to rapidly adapt cybersecurity platforms to leverage the most up-to-date threat information to protect against evolving threats. In particular, the toolchains available for converting threat analysts' descriptions of threatware behavior into stateful rules that can be enforced by rule processing engines (e.g., event-driven rule processing engines that respond to particular sets of events monitored by cybersecurity platforms) can be difficult to use, particularly for users who lack advanced computer programming skills.

Various aspects of the systems and methods described herein provide improved tools and techniques for generating stateful rules for behavior-based threat detection. Aspects of the disclosure advantageously permit developers (and/or threat analysts), who do not have advanced computer programming skills, to quickly and easily generate high-level representations of stateful behavioral rules, which are then compiled into a format suitable for execution by a stateful rule processing engine. Further, aspects of the disclosure enable dynamic rules to define stateful access control lists (ACLs) for behaviors, in contrast with traditional ACLs that lack state and intent. A high-level representation of a rule is a rule written in a human-readable form, such as with syntax similar to that of the C programming language.

Aspects of the disclosure describe improved techniques for generating stateful behavioral rules that can be enforced by a rule processing engine. Using the tools and techniques described herein, the behavior and/or intent of cyber threats may be described in a high-level, structured domain specific programming language, and these high-level descriptions of the behavior and/or intent of threatware may be translated into a set of instructions to be executed on stateful rule processing engine (e.g., on an endpoint) via a compiler, interpreter or similar tool. Aspects of the disclosure may be implemented so as to realize one or more of the following advantages. In some examples, the tools and techniques described herein may be used to facilitate the generation and deployment of stateful behavioral rules and to accelerate the hardening of security policies. In some examples, the tools and techniques described herein permit users to create stateful rules that expressly reference threat behaviors in a high-level, domain specific language.

In some examples, the tools and techniques described herein can be used for stateful tracking of intent determined from observable events, which can be used to enhance policies for granting or restricting permission to access resources (e.g., file system access controls). The term "event" as used herein may include any operation performed by a computer system (e.g., an endpoint), activity observed on a computer system, etc., whether in kernel or user space. Some non-limiting examples of events may include loading a particular file (e.g., a particular binary file), executing a particular process, executing a particular application, accessing an address in a particular range of addresses in a memory space, accessing a particular registry entry in an operating system's registry, accessing a particular peripheral device of the computer system, communicating with a particular device (or a device at a particular address, or device(s) within a particular domain), accessing a particular path in a file directory, etc.

Some examples related particularly to techniques for programming a stateful rule processing engine of a cybersecurity platform. Some examples relate particularly to a domain specific language for describing cyber threat behavior, a stateful rule processing engine, and development tools suitable for compiling threat detection rules coded in the domain specific language format into a format executable by the rule processing engine. Aspects of the disclosure describe improved techniques for generating stateful behavioral rules that can be enforced by a rule processing engine. Using the tools and techniques described herein, the behavior and/or intent of cyber threats may be described in a high-level, structured domain specific programming language, and these high-level descriptions of the behavior and/or intent of threatware may be translated into a set of instructions to be executed on stateful rule processing engine (e.g., on an endpoint) via a compiler, transpiler, interpreter or similar tool.

In some examples, the high-level representations of stateful rules are coded in a high-level, domain specific language (DSL). The DSL may provide high-level primitives suitable for (1) expressing sequences of attack behaviors, (2) tagging computational entities (e.g., threads, processes, applications, systems, users, etc.) with states (e.g., user-defined states), and (3) performing operations on endpoint nodes (e.g., reporting activity, blocking activity, terminating processes, etc.). For example, the DSL may suitable for expressing stateful security rules in the format "if <condition> then <reaction>", wherein the condition may be the occurrence of an event detected at the endpoint, a state of a computational entity on the endpoint (e.g., stage of completion, a metric value such as amount of traffic, or remote node sending or receiving traffic), or a combination of one or more such events and/or states. The reaction may be to change the state(s) assigned to one or more computational entity and/or to perform one or more operations on the endpoint node. In some examples, the DSL is "near natural language" in that it reads left to right with simple conditional expressions and classes of objects. In some examples, the DSL is modular in that subsequent rules can use classifications established in prior rules.

Aspects of the disclosure operate in an unconventional manner by: generating a high-level representation of the stateful rule, wherein the high-level representation is expressed in a DSL; generating a compiled representation of the stateful rule by at least compiling the high-level representation of the stateful rule; loading the compiled representation of the stateful rule onto a rule processing engine of an endpoint node; determining, with the rule processing engine, whether a condition of the compiled representation of the stateful rule is satisfied, based at least on one or more events observed on the endpoint node or on a state of one or more computational entities; and based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

Aspects of the disclosure advantageously improve computer security by compiling a high-level representation of a stateful rule and loading the compiled representation of the stateful rule onto a rule processing engine of an endpoint node, wherein the rule can be used to specify an action to perform in response to a security-related condition being satisfied. Aspects of the disclosure reduce network traffic by bundling the compiled representation of the stateful rule with compiled representations of at least one additional stateful rule, and pushing the compiled rule set to the endpoint node. Aspects of the disclosure further advantageously improve computer security by detecting new threat behavior with an automated threat analysis component. Aspects of the disclosure advantageously improve the machine interface by reducing the level of developer expertise required to rapidly generate new stateful rules in response to newly emerging threats. Aspects of the disclosure implement security policies on user devices, for example, monitoring processes executing on user devices and searching for security policies associated with those processes. Examples include locating security policies, applying the security policies to the processes, and upon failing to locate security policies on the user devices, sending requests to a security policy system. Some examples further include, upon receiving security policies, applying the newly-received security policies to generate new reports and alerts.

FIG. 1 illustrates a block diagram of an example architecture 100 that can advantageously employ stateful rule generation for behavior based threat detection. Architecture 100 includes a first endpoint node 200, other endpoint nodes 200a and 200b, a development node 300, and a threat analysis source 110, connected with a network 102. Endpoint node 200 may be any device, system or service, whether real or virtual, that provides computational capability for a user 120. As illustrated endpoint node 200 is accessing an external resource 140, for example a website, and the communication between endpoint node 200 and external resource 140 involves at least a packet 142. In architecture 100, stateful rules are generated at development node 300 for behavior based threat detection, for example to protect endpoint nodes 200, 200a, and 200b from threatware 152 arriving via attacker node 150. For example, threatware 152 may be an attempt to enable attacker node 150 to masquerade as external resource 140, to install malware onto endpoint node 200, or to exfiltrate data from endpoint node 200.

Threatware 152 is analyzed at threat analysis source 110, for example by a human threat analyst 114 and/or an automated threat analysis component 116. Threatware 152 may be deployed in many forms, including malware, computer viruses, worms, trojan horses, ransomware, spyware, adware, scareware, keystroke loggers, rootkits, bots, crimeware, phishing scams, and others. In some examples, automated threat analysis component 116 leverages machine learning (ML) and or artificial intelligence (AI) for improved threat analysis capability. In some examples, threat analysis source 110 detects new threat behavior (e.g., threatware 152) with automated threat analysis component 116. Resulting threat analysis data 112 is stored and forwarded to development node 300 for use by a developer 130 when generating new stateful rules.

Figure 2:
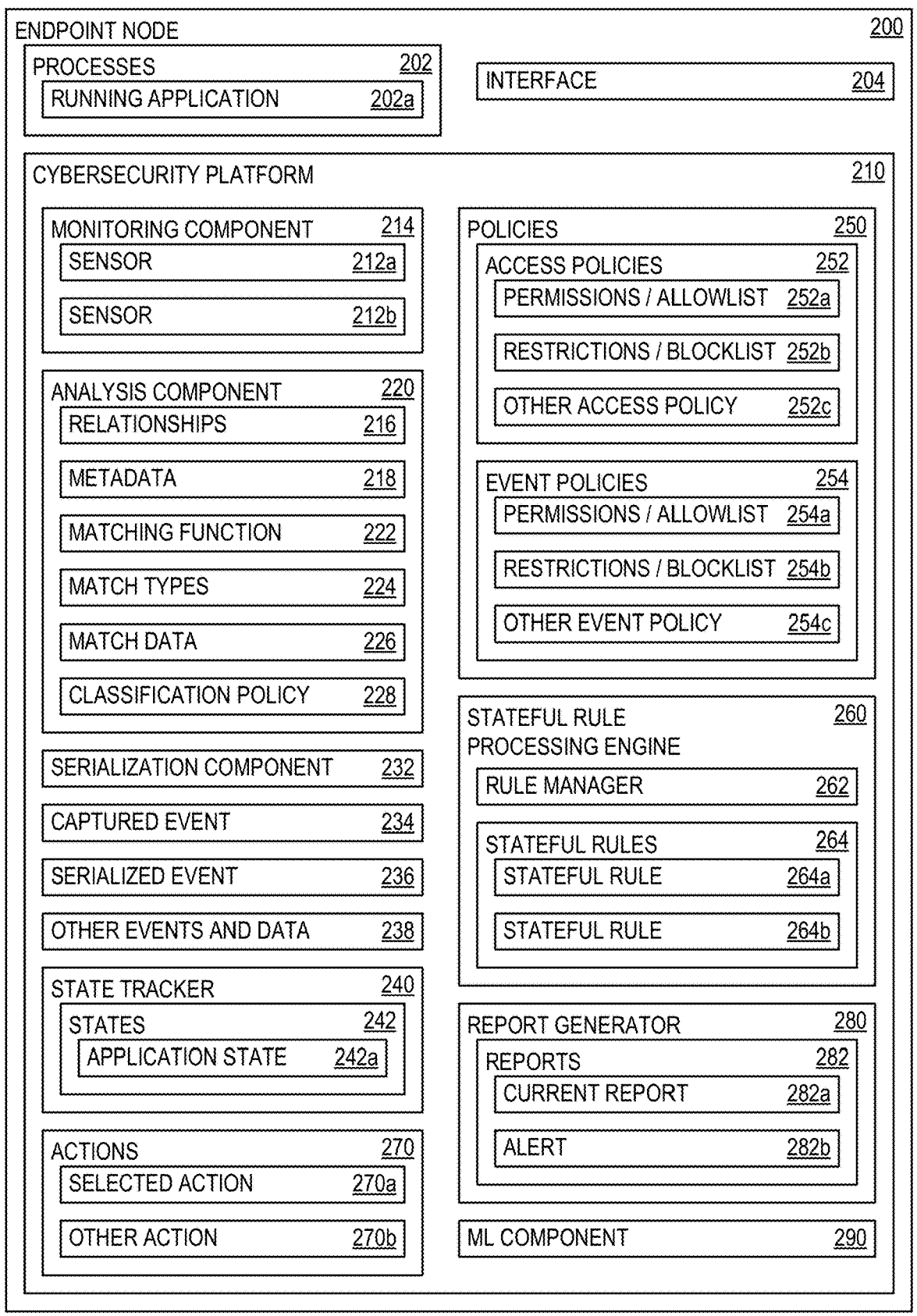
FIG. 2 illustrates an endpoint node associated with the architecture of FIG. 1.

Endpoint node 200 is illustrated with additional detail in FIG. 2. Other endpoint nodes 200a and 200b may be similarly configured. As illustrated, a user 120 uses endpoint node 200, and additional users may be using other endpoint nodes 200a and 200b. Development node 300, which is a stateful rule development node, is illustrated with additional detail in FIG. 3. An advanced threat prevention pipeline 400, which includes components of endpoint node 200 and development node 300 is illustrated with additional detail in FIG. 4.

Referring now to FIG. 2, additional detail is illustrated for endpoint node 200. Endpoint node 200 executes processes 202, for example a running application 202*a*. Running application 202*a* may involve accessing external resource 140 using packet 142, which may be an incoming or outgoing packet. Processes 202 may also be referred to as computational entities. Threatware 152 represents a threat to running application 202*a* and/or other aspects of endpoint node 200, such as by sending a malicious incoming packet or exfiltrating data in one or more packets. A cybersecurity platform 210 on endpoint node 200 protects endpoint node 200 from threatware 152.

Cybersecurity platforms, such as cybersecurity platform 210, that are capable of enforcing stateful behavioral rules may generally perform better than platforms that are capable of enforcing only isolated behavioral rules, at least in certain respects. For example, platforms capable of enforcing stateful behavioral rules may generate false positive alerts at a lower rate than platforms that enforce only isolated behavioral rules, because stateful behavioral rules may define suspicious behavior with much more precision than can be achieved using isolated behavioral rules.

Some exemplary advantages of cybersecurity platform 210 working in conjunction with tools and techniques described herein for development node 300 (of FIG. 3) include: reduction in the turn-around time to implement a defense against new attacks (e.g., threatware 152) in the wild, facilitating the addition of new behavioral rules, rapid hardening of policies, improve ease of use, detection can be more easily leveraged into prevention, improved mining of unfiltered data, improved blocking of certain problematic behaviors, controlled distribution of new stateful rules, and dynamically updated behavioral-based protection.

Cybersecurity platform 210 includes a stateful rule processing engine 260 that is resident on endpoint node 200 and capable of analyzing sequences of events and determining whether the sequences of events match the conditions associated with one or more of stateful rules 264. Cybersecurity platform 210 may also handle reporting of events captured (e.g., captured event 234), management of endpoints, provision of a user interface, and other reporting actions using a report generator 280 and communicating with development node 300 (or another suitable node) via an interface 204 that is communicatively coupled to network 102. One protection against an example attack scenario includes identifying applications spawned by an email application, tagging powershell.exe if spawned by an email application, and if powershell.exe makes a network request, blocking it.

A monitoring component 214 includes sensor 212*a*, sensor 212*b*, and other sensors, as needed. It should be understood that some examples use a different number of sensors. Sensors 212*a* and 212*b* capture events. In some examples, sensing an event with a sensor 212*a* and/or 212*b* comprises capturing an event selected from the list including one or more of the following: an incoming packet, an outgoing packet, an incoming message, on outgoing message, a pending operation, an in-process operation, and a completed operation. The result is captured event 234, which is serialized into a single structured machine readable format to capture events and core information using serialization component 232 to generate serialized event 236. Serialized event 236 is in a form to be used by an analysis component 220, and may include parent child relationships, system relationships, and targets. Information extracted by serialization may include metadata, state, certificate information, a hash value, user information, yara info information (yara is a tool used in malware research and detection), registry key information, and other information.

Analysis component 220 determines relationships 216 of serialized event 236 with other events and data 238. For example, analysis component 220 extracts and analyzes metadata 218, and uses serialized data as an input to a matching function 222 to select a match from candidate match types 224 and store results as match data 226. In some examples, analysis component 220 leverages a classification policy 228 to assist in the classification and matching of serialized event 236. In some examples, event information includes: Event Operations, FileCreate, FileOpenSetAttributes, FileWrite, Create Process, DupThreadHandle, CreateThread, RegWriteValue, RegCreateKey, RegSetSecurity, NetBind, NetListen, and/or NetConnect. In some examples, match types 224 includes: FilePath, FileReputation, FileYaraTags, ProcessCmdLine, ProcessTags, ProcessYaraTags, RegKey, RegValue, IpProtocol, RemotePort, RemoteIPAddress, and/or SystemTags.

A state tracker 240 enables stateful tracking of intent as determined from observable events. States 242 holds states of computational entities, both within endpoint node 200 and, in some examples, within other nodes, such as external resource 140 and one or more of other endpoint nodes 200*a* and 200*b*. For example, application state 242*a* holds the state of running application 202*a*. Cybersecurity platform 210 may use states 242 to infer behaviors being observed (e.g., by sensors 212*a* and 212*b*) and/or the intent of a potential attacker (e.g., attacker node 150) or malware (e.g., threatware 152), and may further use states 242 to determine whether to allow, report, block, or terminate particular behaviors by particular computational entities. In general, events not blocked or terminated are permitted.

Cybersecurity platform 210 leverages policies 250 which, in the illustrated example, includes access policies 252 and event policies 254. Policies 250 governs granting or restricting permission to access resources (e.g., file system access controls and communication attempts over network 102). Access policies 252 includes permissions 252*a*, which is an allowlist of permitted access attempts, and restrictions 252*b*, which is a blocklist of prohibited access attempts. For example, attempting to access (e.g., either send data to or retrieve data from) an known hacker website or file-sharing site may be blocklisted. Event policies 254 includes permissions 254*a*, which is an allowlist of permitted events, and restrictions 254*b*, which is a blocklist of prohibited events. An event that appears within permissions 254*a* may be referred to as an "A event" to indicate it is allowlisted; an event that appears within restrictions 254*b* may be referred to as a "B event" to indicate it is blocklisted; and an event that appears in neither permissions 254*a* nor restrictions 254*b* may be referred to as an "NA event" to indicate it is not allowlisted (or blocklisted). Access policies 252 and event policies 254 further include other access policy 252*c* and other event policy 254*c*, respectively, for access attempts and events that are to be handled with more complexity than allowlisting and blocklisting.

A stateful rule processing engine 260 enforces stateful rules 264 and imports new, incoming stateful rules and policies from development node 300, using a rule manager 262. For example, when development node 300 loads a compiled representation of a new stateful rule onto rule processing engine 260 of endpoint node 200, rule manager 262 is alerted to the new rule and begins enforcing it. As illustrated, stateful rules 264 includes at least one prior stateful rule 264a a new stateful rule 264b. Cybersecurity platform 210 is capable of determining, with rule processing engine 260, whether a condition of new stateful rule 264b (e.g., a compiled representation of a stateful rule generated on development node 300) is satisfied, based at least on one or more events observed on endpoint node 200 or on a state of one or more computational entities (e.g., processes 202). Stateful rules 264 may have the logical structure of "if <condition> then <reaction>", wherein reactions are selected from a set of defined actions 270.

In some examples, determining whether the condition of the compiled representation of a stateful rule (e.g., stateful rule 264b) is satisfied includes, based at least on sensing the event by a sensor (e.g., sensor 212a), determining whether the condition of the compiled representation of the stateful rule is satisfied. The condition may be the occurrence of an event detected at the endpoint, a state of a computational entity on the endpoint (e.g., stage of completion, a metric value such as amount of traffic, or remote node sending or receiving traffic), or a combination of one or more such events and/or states. As indicated, a selected action 270a is selected as a response, over at least one other action 270b, when the condition of stateful rule 264b is detected.

Based at least on determining that the condition of the compiled representation of the stateful rule is satisfied, cybersecurity platform 210 (using rule processing engine 260) performs an action (e.g., a selected action 270a of actions 270) specified by the compiled representation of the stateful rule (e.g., stateful rule 264b). Selected action 270a, the action specified by the compiled representation of the stateful rule, changes the state of the one or more computational entities (e.g., processes 202) or performs one or more operations on endpoint node 200. Cybersecurity platform 210 may thus intervene to protect endpoint node 200 if a computational entity attempts to perform an action that is prohibited by a static rule (e.g., a blocklisted action, also referred to as a "B action") or an action that is not permitted by a static rule (e.g., a non-allowlisted action, also referred to as a "NA action").

A report generator 280 generates reports 282 that may be sent to threat analysis source 110 and/or development node 300 for use in identifying new threats or reporting on the effectiveness of currently-deployed stateful rules 264. For example, cybersecurity platform 210 uses report generator 280 to generate current reports 282a to inform development node of the application of stateful rule 264b to an event sensed for running application 202a. In some examples, report generator 280 creates match data 226.

When warranted, an alert 282b, is generated to inform threat analysis source 110 and/or development node 300 of a new threat or that one of stateful rules 264 is not fully effective. An ML component 290 includes ML and/or AI capability to improve the performance of various components of cybersecurity platform 210.

Figure 3:
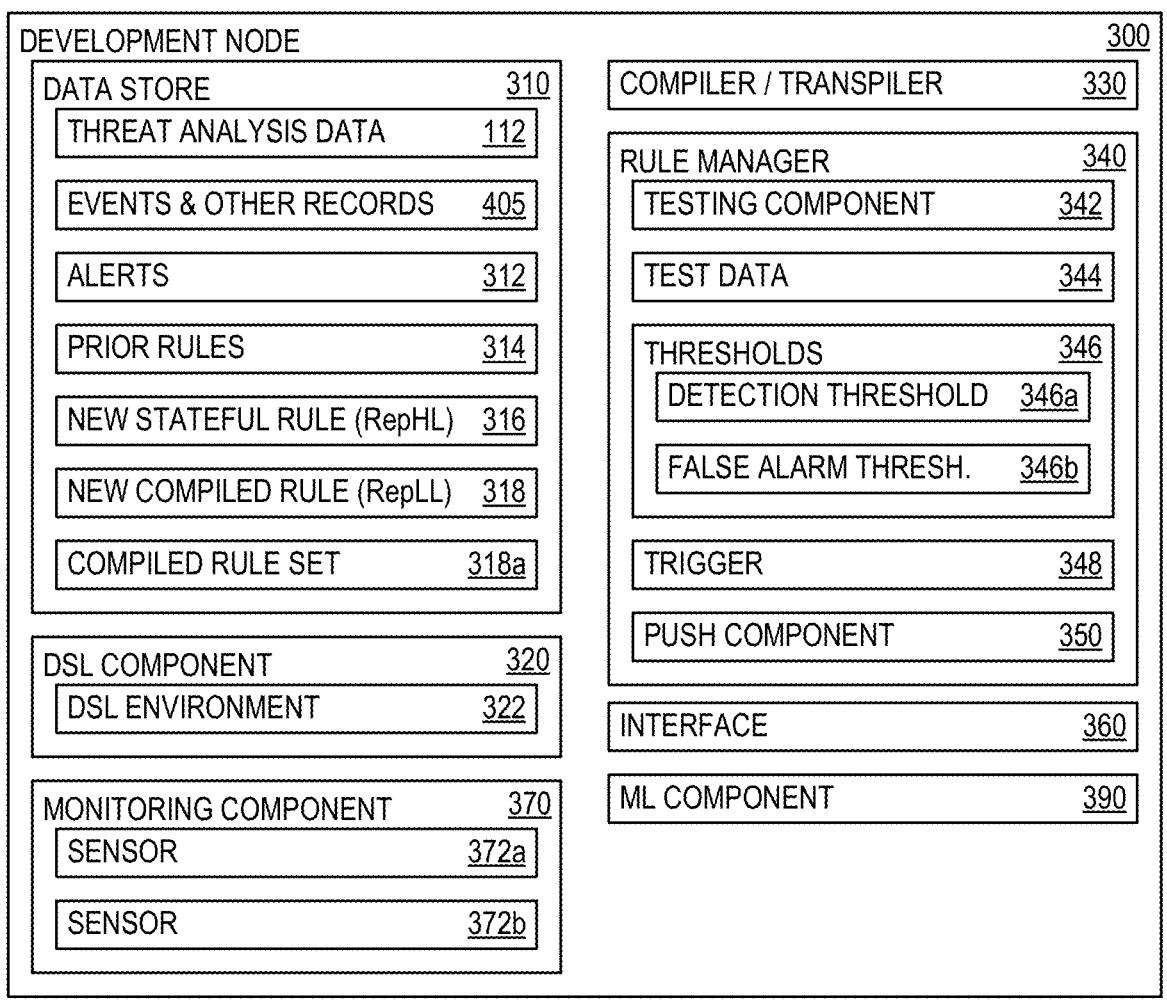
FIG. 3 illustrates a stateful rule development node associated with the architecture of FIG. 1.

Referring now to FIG. 3, additional detail is illustrated for development node 300 in its role as a stateful rule development node. In some examples, development node 300 is provided as a cloud-based service. Development node 300 has a data store 310 that includes threat analysis data 112 received from threat analysis source 110 and an event data store 405, which stores information regarding events that can be used by development node 300 for generating a stateful rule for behavior based threat detection. Data store 310 also includes alerts 312 that may include alerts received from endpoint node 200, for example alert 282b, and other endpoint nodes 200a and 200b. New threat behavior may be discovered by analyzing data records of events, which may be stored in an event data store 405. Data records of the events in event data store 405 may be provided by threat sensors 212a, 212b, 372a, or 372b, or may be generated based on events monitored by the threat sensors. As illustrated, development node 300 has its own monitoring component 370, which is used for identifying new threats and testing the effectiveness of new rules prior to deployment.

Data store 310 further includes prior stateful rules 314, which may be useful in the generation of new stateful rules. For example, in some examples, generating a high-level representation of a new stateful rule comprises using a classification established in a prior stateful rule (e.g., the high level representation of a stateful rule that had been compiled into stateful rule 264a). Additionally, data store 310 holds in-process and newly-generated stateful rules. Initially, new stateful rules may be generated by coding in a DSL format.

A DSL is a computer language specialized to a particular application domain, which may be contrasted with a general-purpose language (GPL) that is broadly applicable across multiple domains. A well-known example of a DSL is hypertext mark-up language (HTML) for web pages. As illustrated, a new stateful rule 316 is in a high-level representation (RepHL), for example in a DSL format. A DSL component 320 provides a DSL programming environment 322 for use by developer 130 when coding new stateful rule 316. That is, development node 300 generates a high-level representation of a new stateful rule, wherein the high-level representation is expressed in a DSL.

In some examples, the DSL provides primitives for identifying events observed on endpoint node 200 and/or other endpoint nodes 200a and 200b, tagging computational entities with states, and performing operations on endpoint node 200 and/or other endpoint nodes 200a and 200b. That is, the DSL provides high-level primitives suitable for (1) expressing sequences of attack behaviors, (2) tagging computational entities (e.g., threads, processes, applications, systems, users, etc.) with states (e.g., user-defined states), and (3) performing operations on endpoint nodes (e.g., reporting activity, blocking activity, terminating processes, etc.). For example, the DSL is suitable for expressing stateful security rules in the format "if <condition> then <reaction>", wherein the condition can be an event detected at the endpoint, a state of computational entity on the endpoint, or a combination of one or more such events and/or states, and wherein the reaction can be to change the state(s) assigned to one or more computational entity and/or to perform one or more operations on the endpoint node. In some examples, the DSL is "near natural language" in that it reads left to right with simple conditional expressions and classes of objects. In some examples, the DSL is modular in that subsequent rules can use classifications established in prior rules.

Upon completion, new stateful rule 316 is compiled or transpiled into a low-level representation (RepLL) of the rule as new compiled rule 318, using a compiler 330. A low-level representation of a rule is a rule in a format that is executable by stateful rule processing engine 260 of FIG. 2. In some examples, the low-level representation of a rule is in a machine-parsable language. One such example is JSON (JavaScript Object Notation), which is an interpreted language commonly saved in ASCII code format. Unfortunately, when humans write raw JSON, the result is prone to errors and typos. However, because JSON is machine-parsable and may be generated (transpiled) by a machine from a scripting language, it is may be used as the low-level representation of a rule. The low-level representation will be more compact, with stricter syntax requirements (to permit parsing by machine) than the high-level representation.

Development node 300 generates a compiled representation of the stateful rule (e.g., new compiled rule 318) by at least compiling the high-level representation of the stateful rule (e.g., new stateful rule 316). It should be understood that compiling includes transpiling, for example from one human-readable language to another human-readable language that is more prone to errors. Thus, in some examples, generating a compiled representation is generating a transpiled representation. New compiled rule 318 is executable by rule processing engine 260, to enforce the new rule. Thus, development node 300 includes development tools, for example compiler 330, suitable for compiling threat detection rules, initially coded in a DSL format, into a format executable by rule processing engine 260. In some examples, compiler 330 is a transpiler. A transcompiler or transpiler is a source-to-source compiler (S2S compiler), which is a type of compiler that takes the source code of a program written in a programming language as its input and produces the equivalent source code in the same or a different programming language. In some examples, compiler 330 is modular, to support modules and importing rules, and composable, to enable developer 130 to build custom rule types, in addition to provided class definitions and types. It should be understood that compiling includes transpiling, for example from one human-readable language to another human-readable language that is more prone to errors.

A rule manager 340 provides management components for distribution of new rules to endpoints, maintenance of hierarchy and exceptions and rules, and reporting of successful or unsuccessful application of rules. A testing component 342 tests new compiled rule 318 (the low-level representation (RepLL) of the rule) and stores the results in 344. In some examples, testing component 342 determine the true detection rate and/or the false positive rate. These are compared with one or more thresholds in thresholds 346, for example detection threshold 346a and false alarm threshold 346b. If new compiled rule 318 is deemed ineffective (e.g., because the true detection rate is less than detection threshold 346a and/or the false positive rate is greater than false alarm threshold 346b), a better rule may be needed.

A trigger component 348 determines whether new compiled rule 318 should be deployed, using push component 350, to one or more of endpoint nodes 200, 200a, and 200b. In some examples, trigger component 348 considers the effectiveness of new compiled rule 318, the time elapsed since the latest push of a rule, and/or the number of new rules that are awaiting deployment. Push component 350 loads new compiled rule 318 (e.g., the compiled representation of the stateful rule) onto rule processing engine 260 of endpoint node 200, and in some examples, also loads new compiled rule 318 onto rule processing engines of other endpoint nodes 200a and 200b. In this manner, new compiled rule 318 becomes deployed stateful rule 264b.

If multiple new rules are awaiting deployment, they may be bundled into a compiled rule set 318a (which now includes new compiled rule 318) and pushed together. In some examples, development node 300 generates compiled rule set 318a by bundling the compiled representation of the stateful rule (new compiled rule 318) with compiled representations of at least one additional stateful rule. In such examples, loading the compiled representation of the stateful rule onto rule processing engine 260 of endpoint node 200 comprises pushing compiled rule set 318a to endpoint node 200. To accomplish the deployment, push component 350 uses interface 360 to load new compiled rule 318 or compiled rule set 318a onto one or more of endpoint nodes 200, 200a, and 200b, over network 102.

Thus, a rule development tool chain on development node 300 includes DSL component 320, compiler 330, and rule manager 340, facilitates the generation of rules, organization of variables and name spaces for state tags or classification, debugging of rules, and testing of efficacy of sets of rules for coverage to particular frameworks for expressing security techniques and behaviors (e.g., MITRE ATT&CK, Lockheed Martin Cyber Kill Chain, and others). An ML component 390 includes ML and/or AI capability to improve the performance of one or more components of the rule development tool chain.

Figure 4:
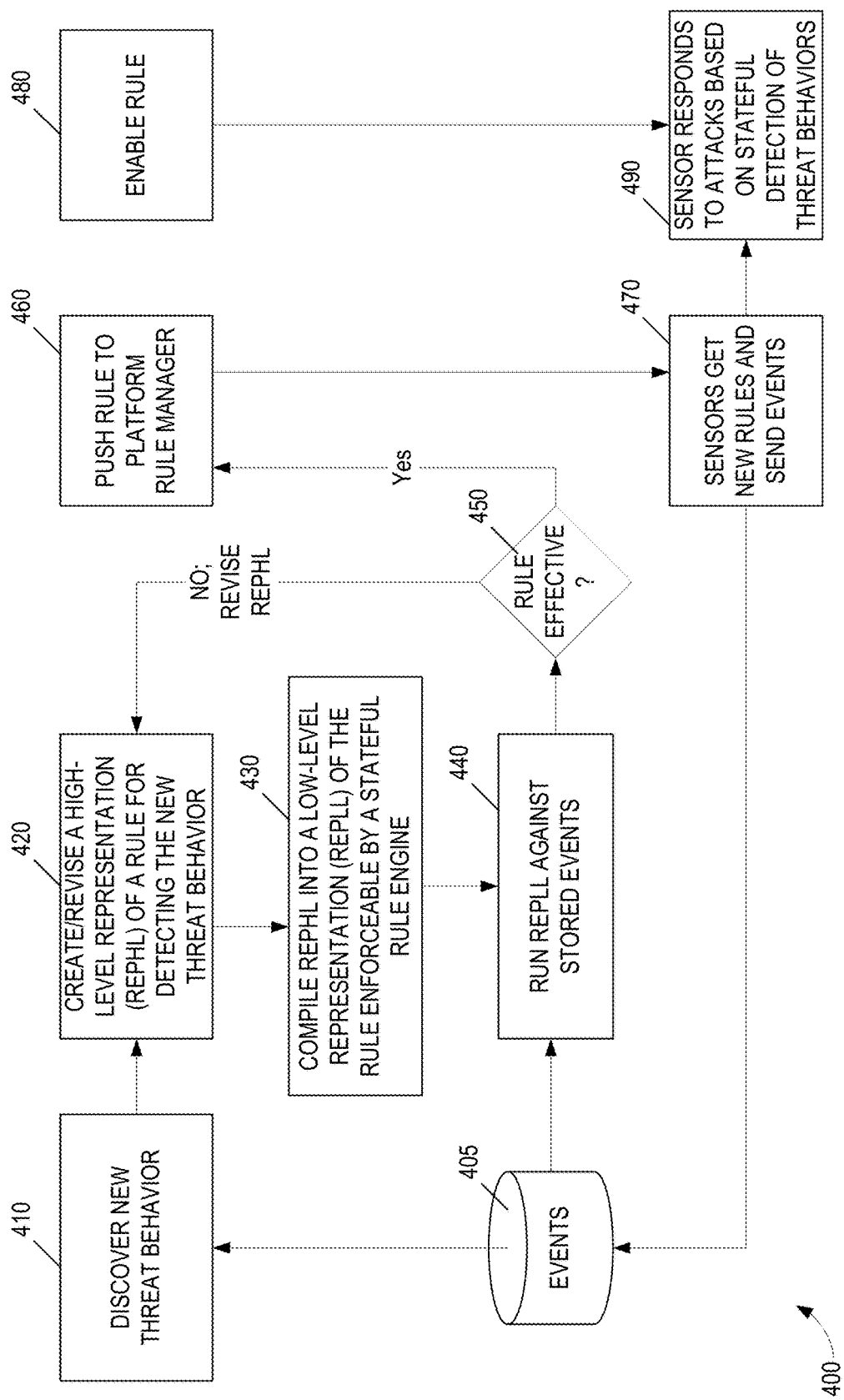
FIG. 4 is a diagram of an advanced threat prevention pipeline, associated with the architecture of FIG. 1, that may be used to generate and deploy stateful rules for behavior-based threat detection, according to some embodiments.

FIG. 4 is a diagram of advanced threat prevention pipeline 400, associated with architecture 100 that may be used to generate and deploy stateful rules for behavior-based threat detection. In operation 410, a new threat behavior is discovered, for example threatware 152. The new threat behavior may be discovered by analyzing data records of events, which may be stored in event data store 405. The data records in event data store 405 may be provided by any threat sensors associated with threat prevention pipeline 400, for example threat sensors 212a and 212b, threat sensors on development node 300, or other threat sensors. The new threat behavior may be detected, for example, by human threat analyst 114 and/or by automated threat analysis component 116.

At 420, RepHL of new stateful rule 316 (e.g., a stateful rule) for detecting and/or blocking the new threat behavior is created (or modified, if it had been created earlier). The high-level representation of new stateful rule 316 may be coded in DSL, as described herein. At 430, the high-level representation of new stateful rule 316 is compiled into RepLL as new compiled rule 318, which can be executed by a stateful rule engine of threat prevention pipeline 400 to enforce the rule. Examples of low-level rule representations are described herein. At 440, new compiled rule 318 is tested, for example by testing component 342 of FIG. 3. In some examples, a rule engine (e.g., an actual rule engine or a simulated rule engine) may be configured to enforce RepLL, and the rule engine may monitor sequences of events obtained from event data store 405 (e.g., event traces).

At 450, a determination is made as to whether new compiled rule 318 is effective at detecting and/or blocking the new threat behavior. In some examples, testing component 342 determine, for new compiled rule 318, a true detection rate (e.g., the number of times the rule correctly detected the new threat behavior divided by the number of times the event traces exhibited the new threat behavior) and/or a false positive rate (e.g., a suitable function of the number of times the rule indicated that the new threat behavior was present when the new threat behavior was, in fact, not present). For example, the false positive rate may be expressed as the time rate at which the rule generated false positives, or the ratio of the number of false positives generated by the rule to the number of threats correctly detected by the rule.

In some examples, the effectiveness of new compiled rule 318 is determined based on the true detection rate and/or the false positive rate. If the rule is deemed ineffective (e.g., because the true detection rate is less than a specified value and/or the false positive rate is greater than a specified value), pipeline 400 may return to operation 420 to improve new compiled rule 318 or create a different new rule. Otherwise, if new compiled rule 318 is deemed effective, then at 460, new compiled rule 318 may be distributed (pushed) by push component 350 of rule manager 340 (both of FIG. 3) to rule manager 262 in stateful rule processing engine 260 (both of FIG. 2). In some examples, components (or the entirety of) rule manager 340 resides in the cloud, and may thus be accessible to users of advanced threat prevention pipeline 400.

After new compiled rule 318 has been distributed, at 470, rule manager 340 may monitor sequences of events detected by various threat sensors to determine whether those event sequences trigger new compiled rule 318. Data records regarding alerts (e.g., alert 282a of FIG. 2) raised by new compiled rule 318 may be stored in event data store 405, along with data records relating to other events monitored by sensors associated with pipeline 400 and alerts generated by other rules.

At 480, a user of advanced threat prevention pipeline 400 may enable new compiled rule 318, which is now stateful rule 264b, on endpoint node 200. To enable new compiled rule 318 on endpoint node 200, pipeline 400 has compiled new stateful rule 316 into new compiled rule 318 and loaded new compiled rule 318 onto rule processing engine 260 on endpoint node 200. In some examples, additional new compiled rules are bundled with new compiled rule 318 to generate compiled rule set 318a, which is loaded onto rule processing engine 260 on endpoint node 200. At 490, sensor 212a and 212b (and other sensors associated with endpoint node 200) respond to attacks based on detection (e.g., stateful detection) of threat behavior, including any new threat behavior detected by new compiled rule 318.

An example shell for an event, as operated upon by advanced threat prevention pipeline 400 is given by:

```
{
  Actors: [
    "operation": {},
    "initiator": {},
    "parent": {},
    "grandparent": {},
    "target": {}
  ]
}
```

An example rule, as operated upon by advanced threat prevention pipeline 400 is given by:

```
if "\outlook,exe" spawns "\excel.exe", "\winword.exe", "\powerpnt.exe",
"**\acrobat.exe" {
  let description = "Tag processes spawned by outlook"
  set_tag("OutlookChlld")
  report(["ReportAsync" ], ["DESTINATION_LOCAL"])
}
```

Another example rule is given by:

```
rule IsExe3 : executable filetype
{
  meta:
    description = "Portable Executable"
    extension = "EXE"
    exe_type = 5
  condition:
    pe.entry_point > 0 or for any i in (0..pe.number_of_sections) :
    (pe.sections[i].characteristics & pe.SECTION_MEM_EXECUTE)
}
```

Figure 5:
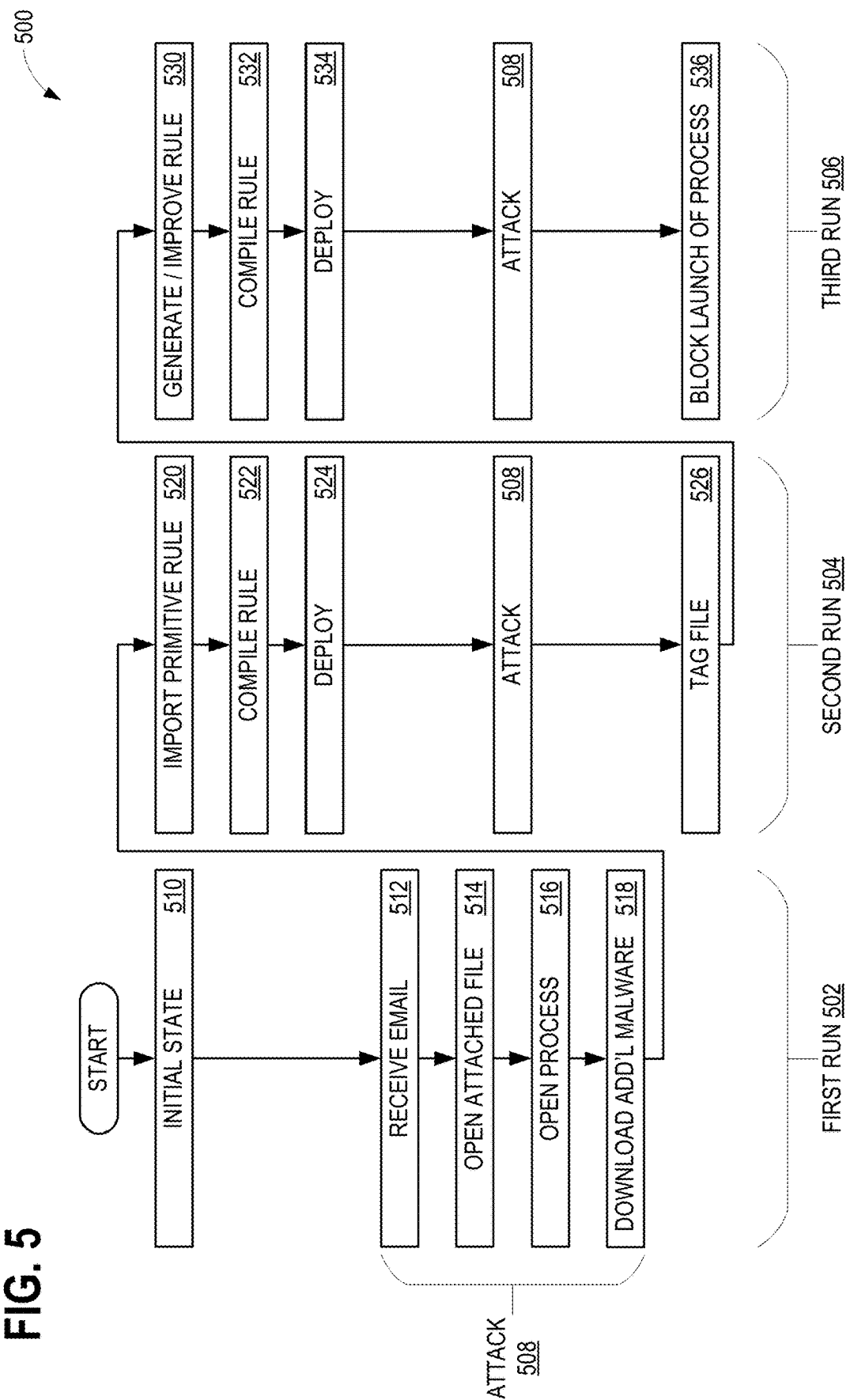
FIG. 5 illustrates a flow chart of exemplary operations associated with the architecture of FIG. 1.

FIG. 5 illustrates a flow chart 500 showing a process improving protection of an endpoint node (e.g., endpoint node 200) using a rule based on the above example. In some examples, the operations of flow chart 500 are performed by one or more computing devices 700 of FIG. 7. The example attack depicted in FIG. 5 is a phishing email with an attached malicious document. Without protection, when an email application opens the malicious document, macros are enabled that run a script to launch a powershell and download additional malware from the internet.

FIG. 5 illustrates three runs, first run 502, second run 504, and third run 506, of an attack 508. In an initial state 510, rule processing engine 260 has no rule to report or block the launching of a process from a file that is attached to an email. At 512, an email is received with an attached malicious file (e.g., a spreadsheet file). The file is opened at 514, and the application that opens the file (e.g., a spreadsheet application) launches a process (e.g., via a macro) at 516, to download additional malware at 518. This first run 502 of attack 508 is successful.

Having identified the new threat, a primitive rule is imported, at 520, into DSL programming environment 322 for use in protecting endpoint node 200. The primitive rule includes identifying and tagging a file that is attached to an email and launches a process. The rule is compiled at 522 and deployed to endpoint node 200 at 524. Attack 508 is tried again, but this time the new rule tags the file at 526. Now, with additional information about the threat, the rule is improved (or a new rule is generated) at 530. The rule is compiled at 532 and deployed to endpoint node 200 at 544. Attack 508 is tried again, but this time the process launch is blocked by the rule at 536.

Figure 6A:
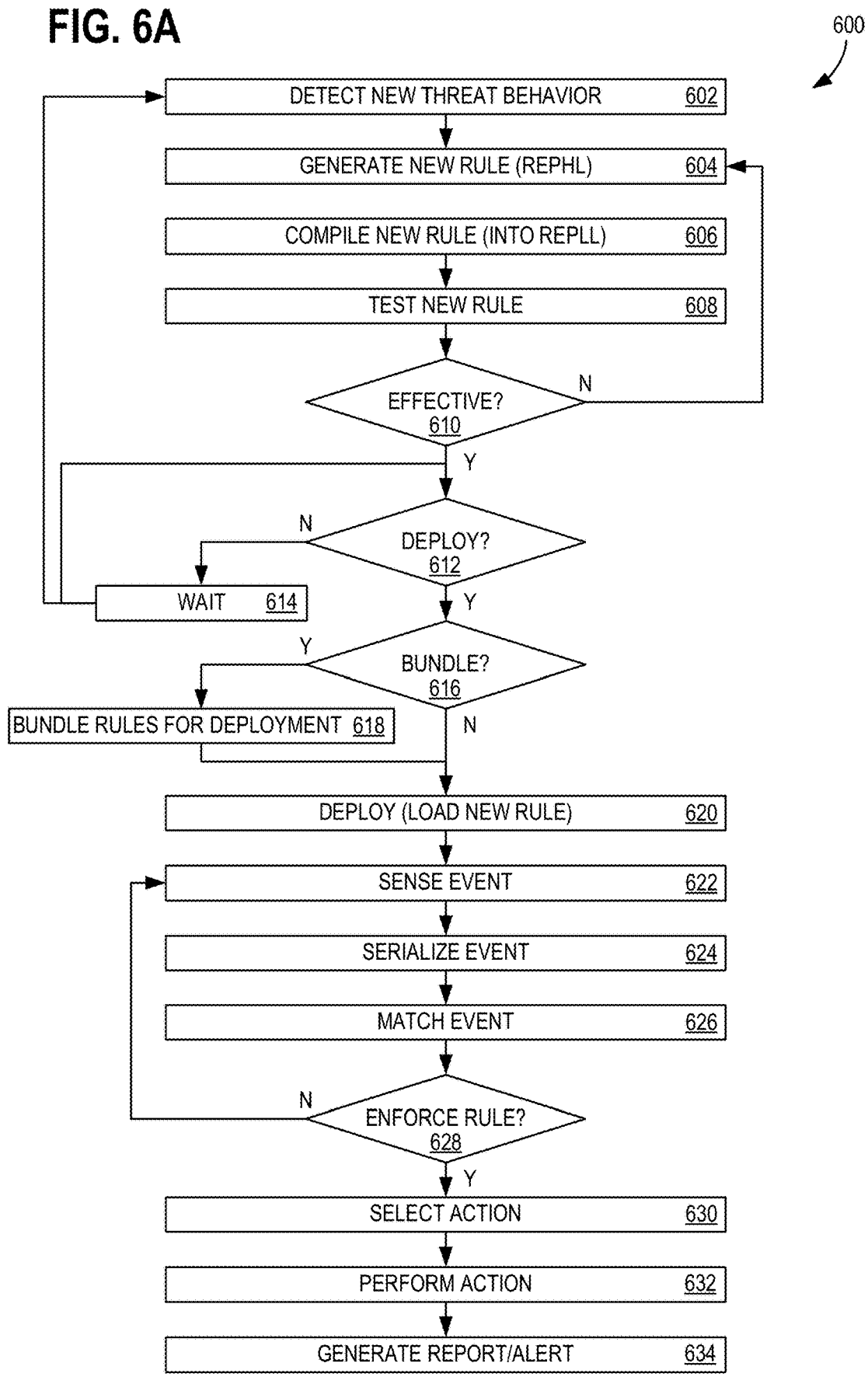

FIG. 6A illustrates a flow chart 600 showing a method of generating a stateful rule for behavior based threat detection. In some examples, the operations of flow chart 600 are performed by one or more computing devices 700 of FIG. 7. Operation 602 includes detecting new threat behavior with an automated threat analysis component. In some examples, detecting new threat behavior comprises detecting new threat behavior with an automated threat analysis component. In some examples, detecting new threat behavior comprises detecting new threat behavior, at least in part, by a human analyst. Operation 604 includes generating a high-level representation of the stateful rule, wherein the high-level representation is expressed in a DSL. In some examples, generating the high-level representation of the stateful rule comprises using a classification established in a prior stateful rule. In some examples, the DSL provides primitives for identifying events observed on the endpoint node, tagging computational entities with states, and performing operations on the endpoint node.

Operation 606 includes generating a compiled representation of the stateful rule by at least compiling the high-level representation of the stateful rule. Operation 608 includes testing the compiled representation of the stateful rule. Decision operation 610 includes determining an effectiveness of the compiled representation of the stateful rule. If the compiled representation of the stateful rule is not sufficiently effective (e.g., as measured by thresholds 346), flow chart 600 returns to 604 to improve the new rule or generate another one.

If, however, the compiled representation of the stateful rule is sufficiently effective, it becomes a candidate for deployment. Decision operation 612 includes determining whether a trigger condition for deployment has been met. A condition may be the occurrence of an event detected at the endpoint, a state of a computational entity on the endpoint (e.g., stage of completion, a metric value such as amount of traffic, or remote node sending or receiving traffic), or a combination of one or more such events and/or states. If not, flow chart 600 waits at 614 or returns to 602 to detect additional new threat behavior. Upon conditions for deployment being met, decision operation 616 determines whether multiple new rules are to be bundled for deployment together. If so, operation 618 includes generating a compiled rule set by bundling the compiled representation of the stateful rule with compiled representations of at least one additional stateful rule. Operation 620 includes loading the compiled representation of the stateful rule onto a rule processing engine of an endpoint node. In some examples, loading the compiled representation of the stateful rule onto the rule processing engine of the endpoint node comprises pushing the compiled rule set to the endpoint node.

At the endpoint node, operation 622 includes sensing an event with a sensor. In some examples, sensing the event with the sensor comprises capturing an event selected from the list including one or more of the following: an incoming packet, an outgoing packet, an incoming message, on outgoing message, a pending operation, an in-process operation, and a completed operation. The sensed (captured) event is serialized in operation 624 and matched to known types of events (e.g., with match types 224 using matching function 222) in operation 626. Decision operation 628 includes determining, with the rule processing engine, whether a condition of the compiled representation of the stateful rule is satisfied, based at least on one or more events observed on the endpoint node or on a state of one or more computational entities. In some examples, determining whether the condition of the compiled representation of the stateful rule is satisfied comprises, based at least on sensing the event by the sensor, determining whether the condition of the compiled representation of the stateful rule is satisfied. If no conditions warrant enforcement of the rule, flow chart 600 returns to 622 to sense and capture additional events.

If, however, a rule is to be enforced (including the newly loaded compiled representation of the stateful rule), operation 630 includes selecting an action to perform, based at least on the rule. Operation 632 includes, based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node. Operation 634 includes generating a report on the effectiveness of the new stateful rule and/or generating an alert (e.g., for development node 300 and/or threat analysis source 110).

FIG. 6B illustrates a flow chart 650 showing a method of generating a stateful rule for behavior based threat detection. In some examples, the operations of flow chart 650 are performed by one or more computing devices 700 of FIG. 7. Operation 652 includes generating a high-level representation of the stateful rule, wherein the high-level representation is expressed in a DSL. Operation 654 includes generating a compiled representation of the stateful rule by at least compiling the high-level representation of the stateful rule. It should be understood that compiling includes transpiling, for example from one human-readable language to another human-readable language that is more prone to errors. Thus, in some examples, generating a compiled representation is generating a transpiled representation. Operation 656 includes loading the compiled representation of the stateful rule onto a rule processing engine of an endpoint node. Operation 658 includes determining, with the rule processing engine, whether a condition of the compiled representation of the stateful rule is satisfied, based at least on one or more events observed on the endpoint node or on a state of one or more computational entities. Operation 660 includes, based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

Figure 7:
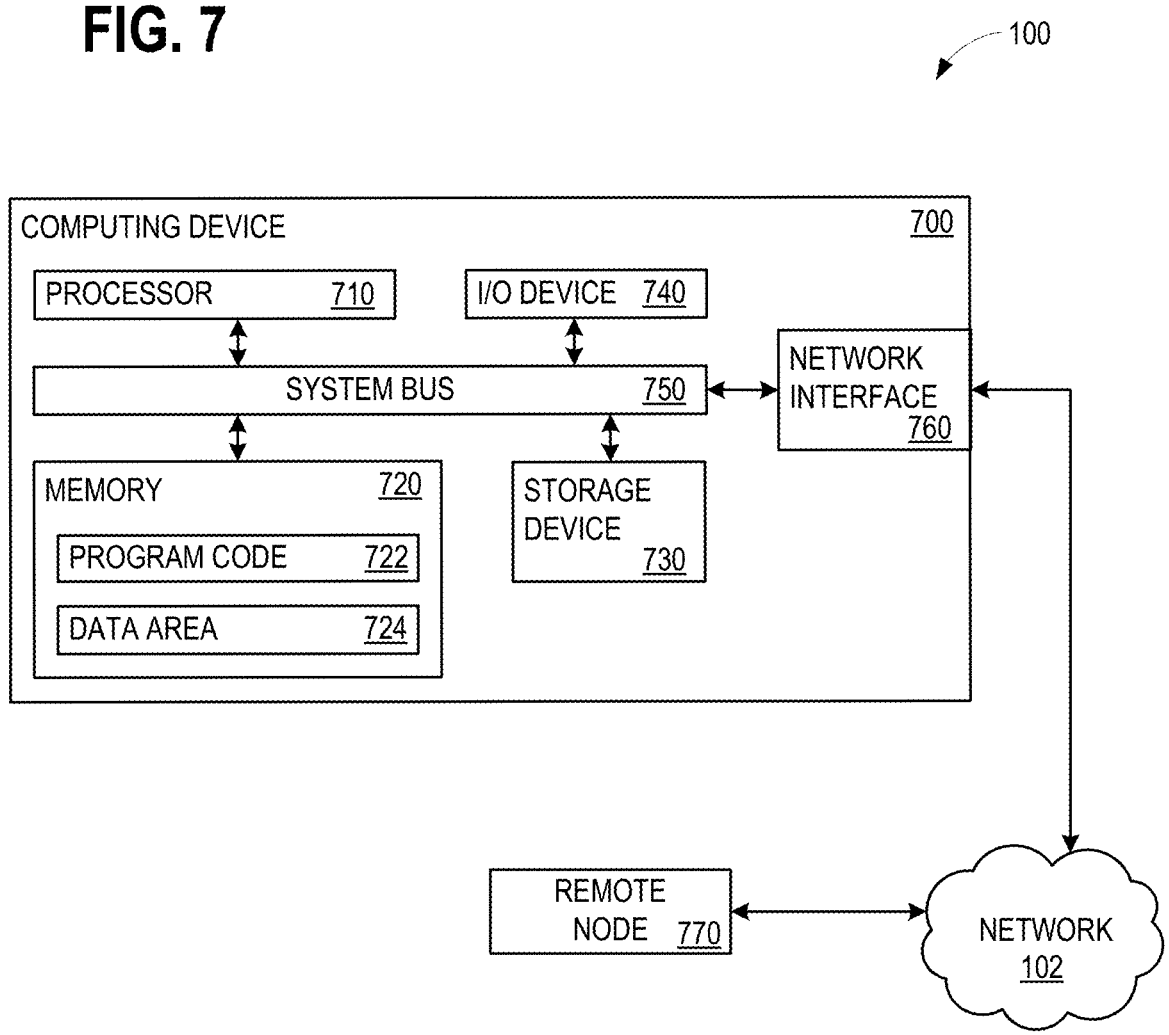
FIG. 7 illustrates a block diagram of a computing device that may be used with the architecture of FIG. 1, according to an example embodiment.

FIG. 7 illustrates a block diagram of computing device 700 that may be used with architecture 100 of FIG. 1. With reference to FIG. 1, computing device 700 may be used for any of endpoint node 200, other endpoint nodes 200a and 200b, development node 300, and threat analysis source 110. Computing device 700 represents any device executing instructions (e.g., as application programs, operating system functionality, or both) to implement the operations and functionality described herein. General-purpose computers, network appliances, mobile devices, or other electronic systems may also include at least portions of computing device 700.

Computing device 700 has at least a processor 710 and a memory 720 that holds program code 722 and a data area 724. Memory 720 is any device allowing information, such as computer executable instructions and/or other data, to be stored and retrieved. For example, memory 720 may include one or more random access memory (RAM) modules, flash memory modules, hard disks, solid-state disks, and/or optical disks. Program code 722 includes computer executable instructions and computer executable components that, along with data within data area 724, implement aspects of the disclosure.

Computing device 700 also includes a storage device 730, and an input/output (I/O) device 740. A network interface 760 permits communication over network 102 with remote node 770, which may represents any of the nodes identified in FIG. 1. Each of the components 710, 720, 730, 740, and 760 may be interconnected, for example, using a system bus 750. Processor 710 is capable of processing instructions for execution within computing device 700. In some examples, processor 710 is a single-threaded processor. In some examples, processor 710 is a multi-threaded processor. Processor 710 is capable of processing instructions stored in memory 720 or on storage device 730. Processor 710 may include any quantity of processing units and may be programmed to execute any components of program code 722. In some examples, processor 710 is programmed to execute instructions such as those illustrated in the figures. Memory 720 stores information within computing device 700. In some examples, memory 720 is a non-transitory computer-readable medium. In some examples, memory 720 is a volatile memory unit. In some examples, memory 720 is a non-volatile memory unit.

Storage device 730 is capable of providing mass storage for computing device 700. In some examples, storage device 730 is a non-transitory computer-readable medium. In various different examples, storage device 730 may include, for example, a hard disk device, an optical disk device, a solid-date drive, a flash drive, or some other large capacity storage device. For example, storage device 730 may store long-term data (e.g., database data, file system data, etc.). I/O device 740 provides input/output operations for computing device 700. In some examples, I/O device 740 may include driver devices configured to receive input data and send output data to other input/output devices, e.g., keyboard, printer and display devices.

In some examples, network interface 760 may include one or more network interface devices, e.g., an Ethernet card, a serial communication device, e.g., an RS-232 port, and/or a wireless interface device, e.g., an 802.11 card, a 3G wireless modem, a 4G wireless modem, or 5G modem, or another modem. Computing device 700 may include any portable or non-portable device including a mobile telephone, laptop, tablet, computing pad, netbook, gaming device, portable media player, desktop personal computer, kiosk, embedded device, and/or tabletop device. Additionally, computing device 700 may represent a group of processing units or other computing devices, such as in a cloud computing system or service.

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

In some examples, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. Storage device 730 may be implemented in a distributed way over a network, such as a server farm or a set of widely distributed servers, or may be implemented in a single computing device.

Although an example has been described in FIG. 7, examples of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Examples of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) may be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification may be performed by one or more programmable computers executing one or more computer programs to perform functions by operating on input data and generating output. The processes and logic flows can also be performed by, and apparatus can also be implemented as, special purpose logic circuitry, e.g., an FPGA or an ASIC.

Computers suitable for the execution of a computer program may include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, examples of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Examples of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. A computing system can include clients and servers. A client and server are generally remote from each other and typically interact through a communication network. The relationship of client and server arises by virtue of computer programs running on the respective computers and having a client-server relationship to each other.

Additional Examples

An example system for generating a stateful rule for a rule processing engine of an endpoint node comprises: a processor; and a computer-readable medium storing instructions that are operative upon execution by the processor to: generating a high-level representation of the stateful rule, wherein the high-level representation is expressed in a DSL; generating a compiled representation of the stateful rule by at least compiling the high-level representation of the stateful rule; loading the compiled representation of the stateful rule onto a rule processing engine of an endpoint node; determining, with the rule processing engine, whether a condition of the compiled representation of the stateful rule is satisfied, based at least on one or more events observed on the endpoint node or on a state of one or more computational entities; and based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

Another example system for generating a stateful rule for a rule processing engine of an endpoint device comprises: obtaining a high-level representation of the stateful rule, wherein the high-level representation is expressed in a DSL that provides primitives for (1) identifying events observed on the endpoint device, (2) tagging computational entities with states, and (3) performing operations on the endpoint node; compiling the high-level representation of the stateful rule, thereby generating a machine-readable representation of the stateful rule; loading the machine-readable representation of the stateful rule onto the rule processing engine of the endpoint device; with the rule processing engine, determining whether a condition of the stateful rule is satisfied based at least in part on one or more events observed on the endpoint device and/or on states of one or more computational entities; and if the condition of the stateful rule is determined to be satisfied, performing an action specified by the stateful rule.

An exemplary method of generating a stateful rule for behavior based threat detection comprises: generating a high-level representation of the stateful rule, wherein the high-level representation is expressed in a DSL; generating a compiled representation of the stateful rule by at least compiling the high-level representation of the stateful rule; loading the compiled representation of the stateful rule onto a rule processing engine of an endpoint node; determining, with the rule processing engine, whether a condition of the compiled representation of the stateful rule is satisfied, based at least on one or more events observed on the endpoint node or on a state of one or more computational entities; and based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

One or more exemplary non-transitory computer storage medium having computer-executable instructions that, upon execution by a processor, cause the processor to at least perform operations that comprise: generating a high-level representation of a stateful rule, wherein the high-level representation is expressed in a DSL; generating a compiled representation of the stateful rule by at least compiling the high-level representation of the stateful rule; loading the compiled representation of the stateful rule onto a rule processing engine of an endpoint node; determining, with the rule processing engine, whether a condition of the compiled representation of the stateful rule is satisfied, based at least on one or more events observed on the endpoint node or on a state of one or more computational entities; and based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

Alternatively, or in addition to the other examples described herein, examples include any combination of the following:

the DSL provides primitives for identifying events observed on the endpoint node, tagging computational entities with states, and performing operations on the endpoint node;

sensing an event with a sensor;

determining whether the condition of the compiled representation of the stateful rule is satisfied comprises, based at least on sensing the event by the sensor, determining whether the condition of the compiled representation of the stateful rule is satisfied;

sensing an event with the sensor comprises capturing an event selected from the list including one or more of the following: an incoming packet, an outgoing packet, an incoming message, on outgoing message, a pending operation, an in-process operation, and a completed operation;

generating a compiled rule set by bundling the compiled representation of the stateful rule with compiled representations of at least one additional stateful rule;

loading the compiled representation of the stateful rule onto the rule processing engine of the endpoint node comprises pushing the compiled rule set to the endpoint node;

detecting new threat behavior with an automated threat analysis component;

generating the high-level representation of the stateful rule comprises using a classification established in a prior stateful rule; and determining whether the condition of the stateful rule is satisfied is performed in response to a sensor of a cybersecurity platform observing an event on the endpoint node.

Exemplary Operating Environment

The operations described herein may be performed by a computer or computing device. The computing devices comprise processors and computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Aspects of the disclosure transform a general-purpose computer into a special purpose computing device when programmed to execute the instructions described herein.

The detailed description provided above in connection with the appended drawings is intended as a description of a number of examples and is not intended to represent the only forms in which the examples may be constructed, implemented, or utilized. Although these examples may be described and illustrated herein as being implemented in devices such as a server, computing devices, or the like, this is only an exemplary implementation and not a limitation. As those skilled in the art will appreciate, the present examples are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of generating a stateful rule for behavior based threat detection, the method comprising:
   generating a high-level representation of the stateful rule, wherein the high-level representation is expressed in a domain-specific programming language (DSL);
   generating a compiled representation of the stateful rule by at least compiling the high-level representation of the stateful rule;
   loading the compiled representation of the stateful rule onto a rule processing engine of an endpoint node;
   determining, with the rule processing engine, whether a condition of the compiled representation of the stateful rule is satisfied, based at least on one or more events observed on the endpoint node or on a state of one or more computational entities; and
   based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

2. The method of claim 1, wherein the DSL provides primitives for identifying events observed on the endpoint node, tagging computational entities with states, and performing operations on the endpoint node.

3. The method of claim 1, further comprising:
   sensing an event with a sensor, wherein determining whether the condition of the compiled representation of the stateful rule is satisfied comprises, based at least on sensing the event by the sensor, determining whether the condition of the compiled representation of the stateful rule is satisfied.

4. The method of claim 3, wherein sensing the event with the sensor comprises capturing an event selected from the list consisting of:
   an incoming packet, an outgoing packet, an incoming message, on outgoing message, a pending operation, an in-process operation, and a completed operation.

5. The method of claim 1, further comprising:
   generating a compiled rule set by bundling the compiled representation of the stateful rule with compiled representations of at least one additional stateful rule, and wherein loading the compiled representation of the stateful rule onto the rule processing engine of the endpoint node comprises pushing the compiled rule set to the endpoint node.

6. The method of claim 1, further comprising:
   detecting new threat behavior with an automated threat analysis component.

7. The method of claim 1, wherein generating the high-level representation of the stateful rule comprises using a classification established in a prior stateful rule.

8. A system for generating a stateful rule for behavior based threat detection, the system comprising:
   a processor; and
   a non-transitory computer readable medium having stored thereon program code, the program code causing the processor to:
     generate a high-level representation of the stateful rule, wherein the high-level representation is expressed in a domain-specific programming language (DSL);
     generate a compiled representation of the stateful rule by at least compiling the high-level representation of the stateful rule;
     load the compiled representation of the stateful rule onto a rule processing engine of an endpoint node;
     determine, with the rule processing engine, whether a condition of the compiled representation of the stateful rule is satisfied, based at least on one or more events observed on the endpoint node or on a state of one or more computational entities; and
     based at least on determining that the condition of the compiled representation of the stateful rule is satisfied, perform an action specified by the compiled representation of the stateful rule, wherein the action specified by the compiled representation of the stateful rule comprises changing the state of the one or more computational entities or performing one or more operations on the endpoint node.

9. The system of claim 8, wherein the DSL provides primitives for identifying events observed on the endpoint node, tagging computational entities with states, and performing operations on the endpoint node.

10. The system of claim 8, wherein the program code is further operative to:
    sense an event with a sensor, wherein determining whether the condition of the compiled representation of the stateful rule is satisfied comprises, based at least on sensing the event by the sensor, determining whether the condition of the compiled representation of the stateful rule is satisfied.

11. The system of claim 10, wherein sensing the event with the sensor comprises capturing an event selected from the list consisting of:
    an incoming packet, an outgoing packet, an incoming message, on outgoing message, a pending operation, an in-process operation, and a completed operation.

12. The system of claim 8, wherein the program code is further operative to:
    generate a compiled rule set by bundling the compiled representation of the stateful rule with compiled representations of at least one additional stateful rule, and wherein loading the compiled representation of the stateful rule onto the rule processing engine of the endpoint node comprises pushing the compiled rule set to the endpoint node.

13. The system of claim 8, wherein the program code is further operative to:
    detecting new threat behavior with an automated threat analysis component.

14. The system of claim 8, wherein generating the high-level representation of the stateful rule comprises using a classification established in a prior stateful rule.

15. A non-transitory computer readable storage medium having stored thereon program code executable by a computer system, the program code embodying a method comprising:
    generating a high-level representation of a stateful rule, wherein the high-level representation is expressed in a domain-specific programming language (DSL);

generating a compiled representation of the stateful rule by at least compiling the high-level representation of the stateful rule;

loading the compiled representation of the stateful rule onto a rule processing engine of an endpoint node;

determining, with the rule processing engine, whether a condition of the compiled representation of the stateful rule is satisfied, based at least on one or more events observed on the endpoint node or on a state of one or more computational entities; and based at least on determining that the condition of the compiled representation of the stateful rule is satisfied, performing an action specified by the compiled representation of the stateful rule, wherein the action specified by the compiled representation of the stateful rule comprises changing the state of the one or more computational entities or performing one or more operations on the endpoint node.

16. The non-transitory computer storage medium of claim 15, wherein the DSL provides primitives for identifying events observed on the endpoint node, tagging computational entities with states, and performing operations on the endpoint node.

17. The non-transitory computer storage medium of claim 15, wherein the method embodied by the program code further comprises:

sensing an event with a sensor, wherein determining whether the condition of the compiled representation of the stateful rule is satisfied comprises, based at least on sensing the event by the sensor, determining whether the condition of the compiled representation of the stateful rule is satisfied.

18. The non-transitory computer storage medium of claim 17, wherein sensing the event with the sensor comprises capturing an event selected from the list consisting of:

an incoming packet, an outgoing packet, an incoming message, on outgoing message, a pending operation, an in-process operation, and a completed operation.

19. The non-transitory computer storage medium of claim 15, wherein the method embodied by the program code further comprises:

generating a compiled rule set by bundling the compiled representation of the stateful rule with compiled representations of at least one additional stateful rule, and wherein loading the compiled representation of the stateful rule onto the rule processing engine of the endpoint node comprises pushing the compiled rule set to the endpoint node.

20. The non-transitory computer storage medium of claim 15, wherein the method embodied by the program code further comprises:

detecting new threat behavior with an automated threat analysis component.

* * * * *